(12) United States Patent
Buttrick et al.

(10) Patent No.: US 6,240,332 B1
(45) Date of Patent: *May 29, 2001

(54) TOOLING HEAD CONTROLLER

(75) Inventors: James N. Buttrick, Seattle; Darrell D. Jones, Mill Creek, both of WA (US)

(73) Assignee: The Boeing Company, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/469,118

(22) Filed: Jun. 6, 1995

Related U.S. Application Data

(62) Division of application No. 08/237,435, filed on Apr. 29, 1994.

(51) Int. Cl.[7] .................................................. G06F 15/46
(52) U.S. Cl. ...................... 700/169; 700/170; 700/179; 700/192
(58) Field of Search .................... 364/474.02, 474.16, 364/474.18, 474.2, 474.21, 474.34, 191, 474.01, 474.11, 474.22, 474.23, 474.3, 474.32, 474.36; 700/169, 170, 179, 192

(56) References Cited

U.S. PATENT DOCUMENTS

| | | |
|---|---|---|
| 3,725,987 | 4/1973 | Kurimoto et al. . |
| 3,846,880 | 11/1974 | Foll et al. . |
| 3,913,429 * | 10/1975 | Uchida et al. .................. 364/474.02 |
| 4,057,881 * | 11/1977 | Stephens ............................ 29/27 C |
| 4,090,281 | 5/1978 | Hautau . |
| 4,092,720 * | 5/1978 | Carey .................................. 700/181 |
| 4,180,195 | 12/1979 | Caley et al. . |
| 4,310,964 | 1/1982 | Murphy . |
| 4,577,389 * | 3/1986 | Shultz ..................................... 483/23 |
| 4,587,703 | 5/1986 | Azizi et al. . |
| 4,609,134 | 9/1986 | Davern . |
| 4,645,112 | 2/1987 | Davern et al. . |
| 4,656,726 | 4/1987 | Suzuki et al. . |
| 4,663,999 | 5/1987 | Catlin . |
| 4,727,982 * | 3/1988 | Hayashi et al. ................... 198/346.1 |
| 4,738,170 | 4/1988 | Isawa et al. . |
| 4,747,193 | 5/1988 | Gregory . |
| 4,872,258 | 10/1989 | Ragard . |
| 4,928,221 * | 5/1990 | Belkhiter ......................... 364/474.24 |
| 5,189,624 * | 2/1993 | Barlow et al. ....................... 700/169 |
| 5,259,100 * | 11/1993 | Takahashi .............................. 408/20 |

* cited by examiner

Primary Examiner—Reba I. Elmore
(74) Attorney, Agent, or Firm—Lawrence W. Nelson; J. Michael Neary

(57) ABSTRACT

A controller, for use with a fastener installation apparatus having a primary turret tooling head and an opposed reactionary tooling head, includes a data acquisition computer and several servomotors controlled by the computer for operatively connecting the computer to the primary tooling head turret for rotatably positioning the turret, and actuating the tools. The servo operated drive systems are computer operated and numerically controlled to position the turret relative to the work piece for accurate and repeatable positioning of the tools on the turret over the desired location of the hole without sacrificing desirable machine rigidity for some fastening operations. The system includes programming means operable to cause the computer to rotate the primary turret tooling head and actuate the tools using the computer numerically controlled servo motors for remotely controlling both the linear carriage position, the turret angular rotation, and actuation of the tools.

4 Claims, 8 Drawing Sheets

TOOLING HEAD CONTROLLER

This is a division of U.S. application Ser. No. 08/237,435 filed on Apr. 29, 1994 and entitled "Turret Head Fastener Installation".

This invention relates to tooling for the installation of fasteners, and more particularly to a turret tooling system for the sequential processes used to prepare fastener holes and to install fasteners in airplane wing skin panels or similar structure, and to a system for accurately controlling turret operation.

BACKGROUND OF THE INVENTION

The need to install panel fasteners occurs throughout the aerospace industry as well as in other industries. The process for installing a fastener varies, but often involves some combination of the following steps: clamping the structure to be fastened together; drilling a hole through the structure; coldworking the hole; reaming, chamfering, and countersinking the hole; inspecting the hole; applying sealant and feeding the fastener to the hole; inserting the fastener in the hole; upsetting the fastener if it is a rivet, or feeding a nut or collar to the installed bolt and torqueing the nut or swaging the collar; shaving the head of the fastener head to insure flushness with the panel; and unclamping the fastened structure.

Automatic fastening machines based on a large C-frame design are widely used in the prior art and offer the capability to arrange a few tooling functions, such as drilling, fastener insertion, and fastener shaver, on a linear positioning carriage. This design is inherently limiting. The carriage typically translates a maximum of about two feet into or out from the C-frame depending on which of the three tools is desired for use. As the carriage moves, the moment that the inertia of it's mass applies to the C-frame causes some frame distortion and vibration. The distortion causes the tools located on the C-frame to contact the part at slightly different angles and at slightly different points. The (normality of the tools at their contact with the workpiece can be corrected with normality correction mechanisms, but this can increase the cost and complexity of the machine and of the programming of the machine control system. While it is possible to build a larger carriage, this requires a more robust and expensive C-frame. A better system would provide a lighter, yet equally precise, tool indexing system that would be less likely to cause C-frame distortion.

Not only does the linear positioning carriage constrain function options and accuracy, it also limits process speed. A linear positioning carriage is slow because of the relatively long distances which it must travel when indexing between tooling locations. The large mass of the cariage and the tools mounted thereon can generate inertial forces when the carriage is moved, especially when it is moved rapidly in an effort to decrease cycle time. These inertial forces can cause vibration or oscillation of the C-frame which must be given time to damp out before attempting processing operations with the tools on the workpiece, thereby lengthening cycle time. The portion of process flow time spent changing tools using conventional linear carriage indexing systems often exceeds seventy percent of the total flow time necessary for fastener installation. Thus, even if a linear positioning carriage could be devised with sufficient structural rigidity to accommodate all the tools desired for fastener installation, the amount of process time spent indexing between these tools could require several fastening stations working simultaneously to achieve the desired production rates. An improved system would reduce the portion of process time consumed in indexing between tools.

Prior art linear positioning carriages require considerable effort to align each tool. Each tool must be adjusted along one linear axis and two rotational axes. Because the carriage travels in only one direction, tools must be shimmed normal to the direction of travel so that the work tip of each tool passes over the same point. The tool must also be rotationally adjusted both in the plane of travel and normal to the plane of travel so that each tool acts along the same axis. Play in the tool-to-carriage mounts allows adjustment in the plane of travel, and shims are used to adjust rotation normal to the plane of travel. A preferred system would simplify tool setup.

The ideal solution would be a fastening system that allows use of several kinds of fasteners such as rivets, bolts with torqued on nuts, and lockbolts with swaged on collars, and one that allows all operations from drilling the fastener hole to shaving the head of the installed fastener without repositioning the fastening station relative to the panel. Because a large number of expensive C-frame systems are currently in use, such a system should be sufficiently dimensionally compact to allow retrofitting the improved system into existing machines.

Tooling turrets have been used in the prior art to position tooling for sequential operations on keyboard assembly systems, as shown in Suzuki et al., U.S. Pat. No. 4,656,726; drilling systems, as shown in Azizi et al., U.S. Pat. No. 4,587,703 and other applications. However, insuperable obstacles have been seen as making impractical or impossible the use of a turret in a C-frame riveter for installing aircraft quality fasteners. Several sequential operations of high precision, such as drilling, coldworking, reaming, and countersinking, are necessary for high quality fastener installation. If the axis of the tools performing these operations do not accurately align with the desired fastener centerline, expensive time consuming rework or part scrap will result. A turret may not precisely locate sequentially positioned tools in the identical position over the fastener hole axis. Moreover, the application of large forces, on the order of 5000 pounds or more, is required for riveting, and the application of such large forces in a rotatable turret system can complicate the turret design. It would be desirable if the tool position could be accurately and repeatably established such that the tooling center for each tool on the turret could be made to coincide with the same point on the part. Thus, process speed would be increased both by having all operations occurring without repositioning or changing tooling, and by accurately installing fasteners, eliminating poorly installed fasteners.

Thus, it would be desirable to create a fastener installation system that could transfer all tooling required for aircraft skin panel hole preparation and fastener installation without shifting the fastening station relative to the panel between operations. Further, because the industry has a large number of commonly designed C-frame fastener systems, the ideal design would replace existing tool carriages with improved carriages without replacing the entire system. It would be relatively compact and require little mass translation during sequential positioning of tools to avoid deflection and oscillation of the C-frame, thereby making possible a short cycle time. It would have the accuracy required for aircraft quality fasteners, enable the application of large magnitude forces for riveting, and require little set-up time by providing a positioning system for accurately indexing the turret based tooling relative to fastener locations regardless of their mounting position on the turret.

SUMMARY OF THE INVENTION

Accordingly, an object of this invention is to provide an improved fastener installation system and method for performing multiple sequential operations for hole preparation and fastener installation at a single workstation without moving the station relative to the workpiece between operations.

Another object of this invention to provide an improved system and method for installing fasteners using a turret type tooling fixture to which a wide array of hole preparation and fastener installation tooling may be affixed and which may be rotatably indexed, allowing sequential operations to be performed simply by rotation and linear translation of the turret to locate the necessary tooling precisely and repeatably over the desired fastener location regardless of the mounting position of the tooling on the turret.

Yet another object of this invention is to provide an improved system for precisely and repeatable controlling turret position using computer numerical control system with the capability of accepting a part program from the original engineering data base with highest authority for the part to adjust turret orientation and location relative to the workpiece.

Still another object of this invention is to provide an improved fastener installation system requiring minimal mass translation and producing minimal oscillation of the C-frame, and allowing high speed shifting of tooling between sequential operations on the workpiece for short cycle time.

A further object of this invention is to provide an improved fastener installation system that is capable of high accuracy and repeatability in positioning precision tooling over the fastener hole axis, while also enabling the application for large forces necessary to form rivets.

These and other objects of this invention are attained in the preferred embodiment disclosed herein and defined in the appended claims of a turret based numerically controlled fastener installation system having a tooling support frame; an upper rotatable turret tooling head on which diverse hole preparation and fastener installation tooling may be attached and in the center of which the rivet upset hydraulic actuator may be attached without applying unbalanced forces on the turret bearings. A central processing unit controls turret positioning using servomotors; and a lower tooling head is aligned with the line of action of the upper tooling head, adaptable to backside rivet upset dies, torque control nut runners, or hydraulic collar swaging devices.

DESCRIPTION OF THE DRAWINGS

The invention and its many attendant objects and advantages will become more clear upon reading the following description of the preferred embodiment in conjunction with the following drawings wherein.

DESCRIPTION OF THE PREFERRED EMBODIMENT

Figure 1:
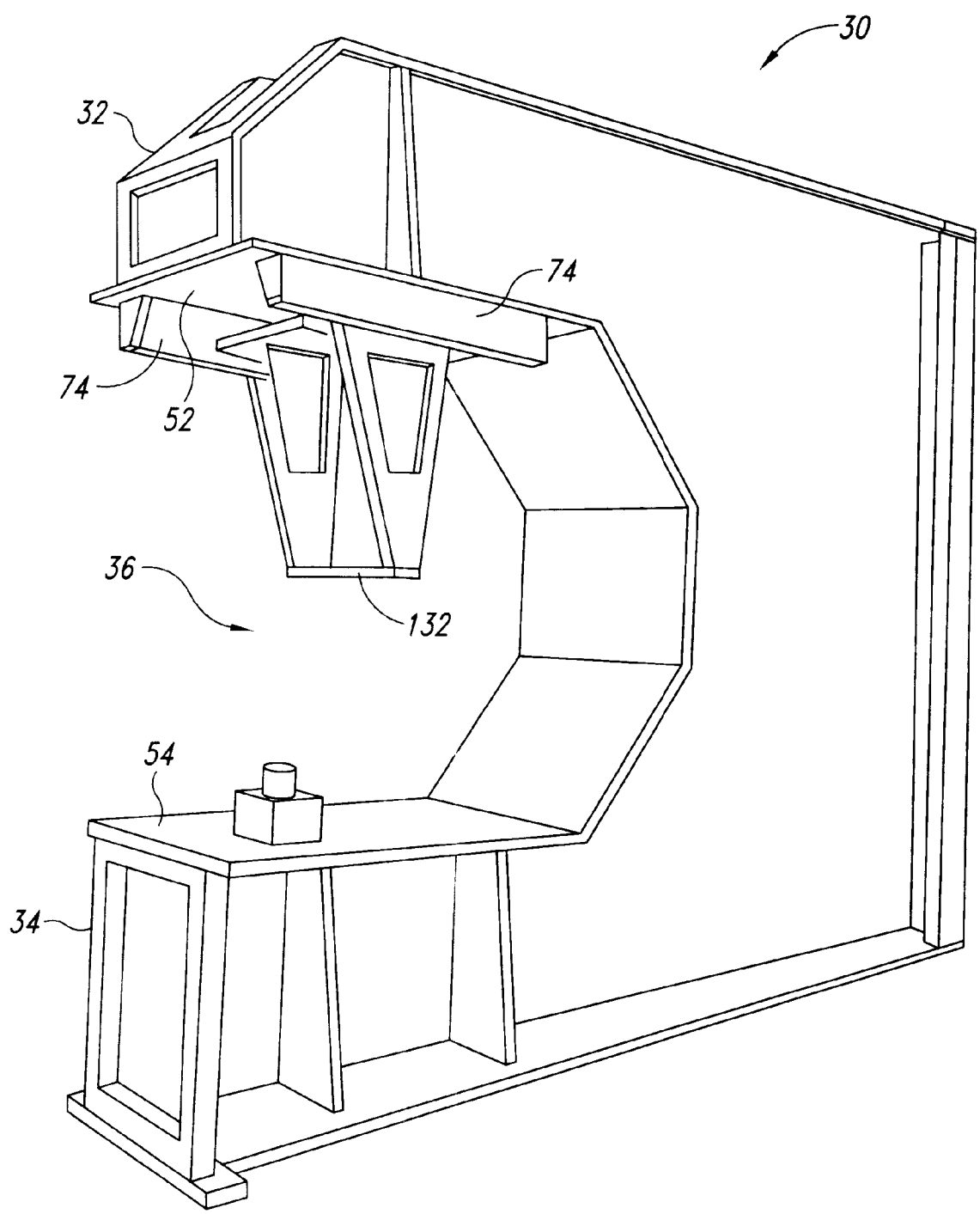
FIG. 1 is an isometric view of a C-frame of a conventional hyrdaulic riveting machine on which a turret head fastener system according to this invention is to be mounted; of the fastener installation station with the adjacent system controller.

Turning now to the drawings, wherein like reference characters designate identical or corresponding parts, and more particularly to FIG. 1 thereof, a conventional C-frame 30 is illustrated as representative of the C-frame on a conventional hydraulic riveter. Because of the cost of of these large structural members and the mechanical systems by which they are moved along large workpieces, such as wing panels, or move workpieces through the C-frame, there is a great reluctance to scrap then and buy new systems just to acquire additional capability. Accordingly, this invention is intended to be capable of retrofitting into existing C-frames of large hydraulic riveting machines, as explained below.

Figure 2:
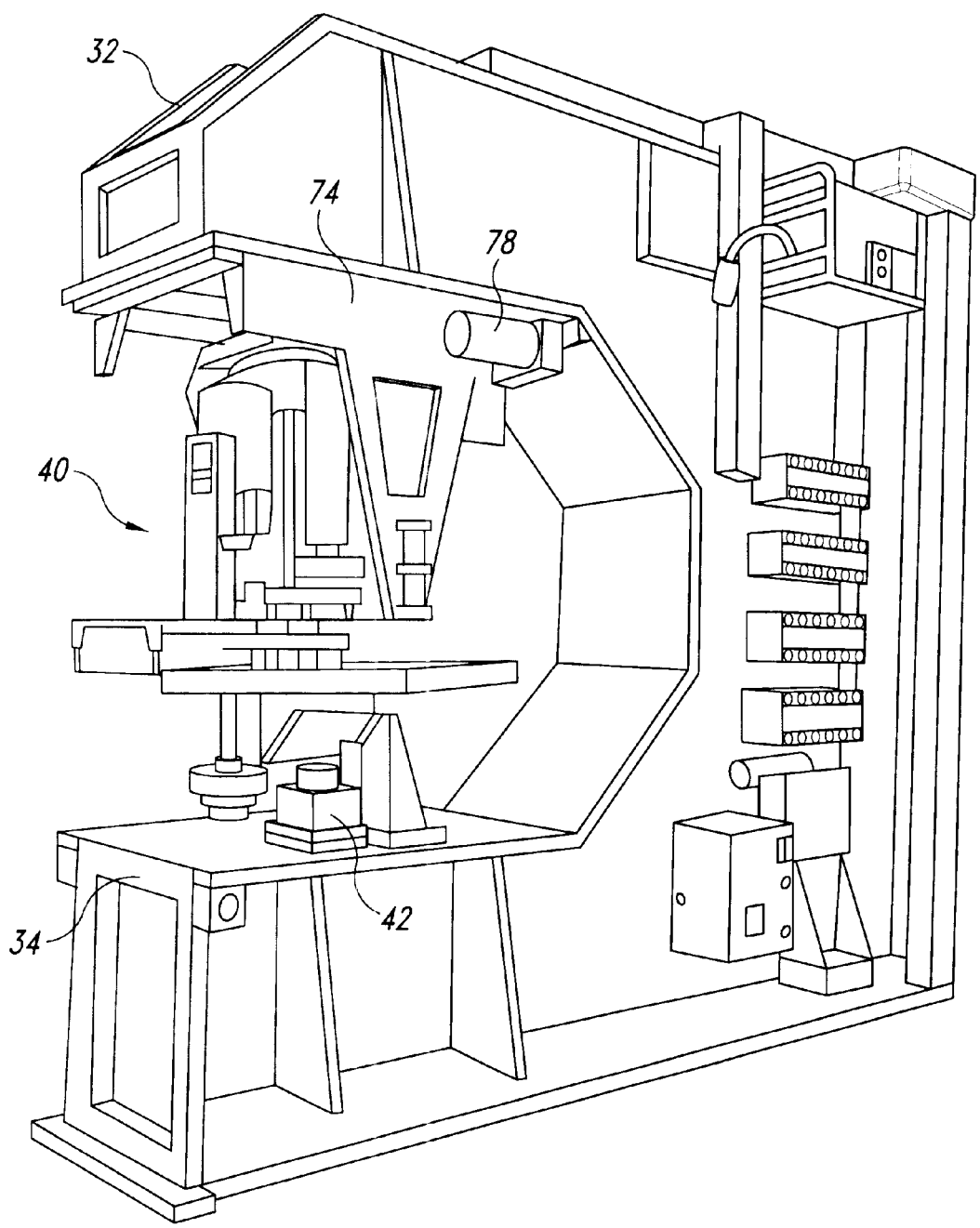
FIG. 2 is an isometric view of the C-frame of FIG. 1 with a turret head fastener system according to this invention mounted thereon.

The existing C-frame 30 shown in FIG. 1 is a welded structure of thick steel plates having upper and lower cantilevered projecting arms 32 and 34, respectively, defining therebetween a work space 36 in which upper and lower tooling, shown in FIG. 2, can be mounted for preparation of holes in the workpiece and installation of fasteners in the holes. Installation of rivets usually involves the exertion of squeezing forces of several thousand pounds on opposite ends of the rivets to create a suitable interference between the rivet and the rivet hole and to form the rivet button, and the C-frame 30 is designed to provide a containing force resisting the outward reaction forces exerted by the hydraulic actuators when they operate to squeeze the rivet.

Turning now to FIG. 2, a rotatable turret head fastener installation system 40 in accordance with this invention is shown mounted on the C-frame 30 for performing hole preparation and fastener installation in a workpiece such as a commercial airplane skin panel and supporting structure. The turret provides the ability to index sequential or commonly interchanged tooling, without shifting the tooling head relative to the part between operations, thereby saving time by avoiding tooling change and set-up operations, and improving the potential for eliminating rework and part scrap. Use of the turret also improves process accuracy by maintaining a fixed position between the primary workhead and the secured workpiece. Use of the turret on this fastening system affords the capacity of withstanding both the forces and the large volume of fastener installations necessary to manufacture large commercial aircraft. The turrets makes possible the compact co-location of a comparatively wide array of hole preparation and fastener installation tooling at a single work station.

Figure 4:
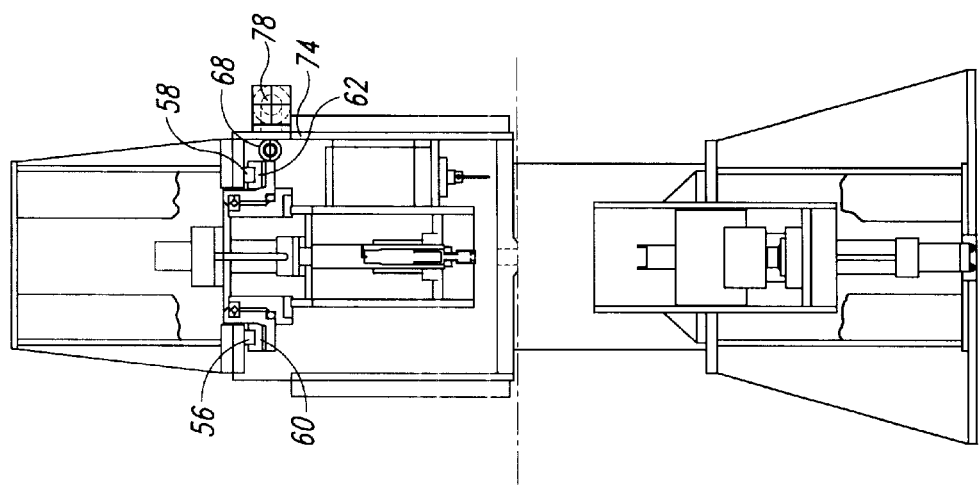
FIG. 4 is a front elevation of the structure shown in FIG. 2.
Figure 3:
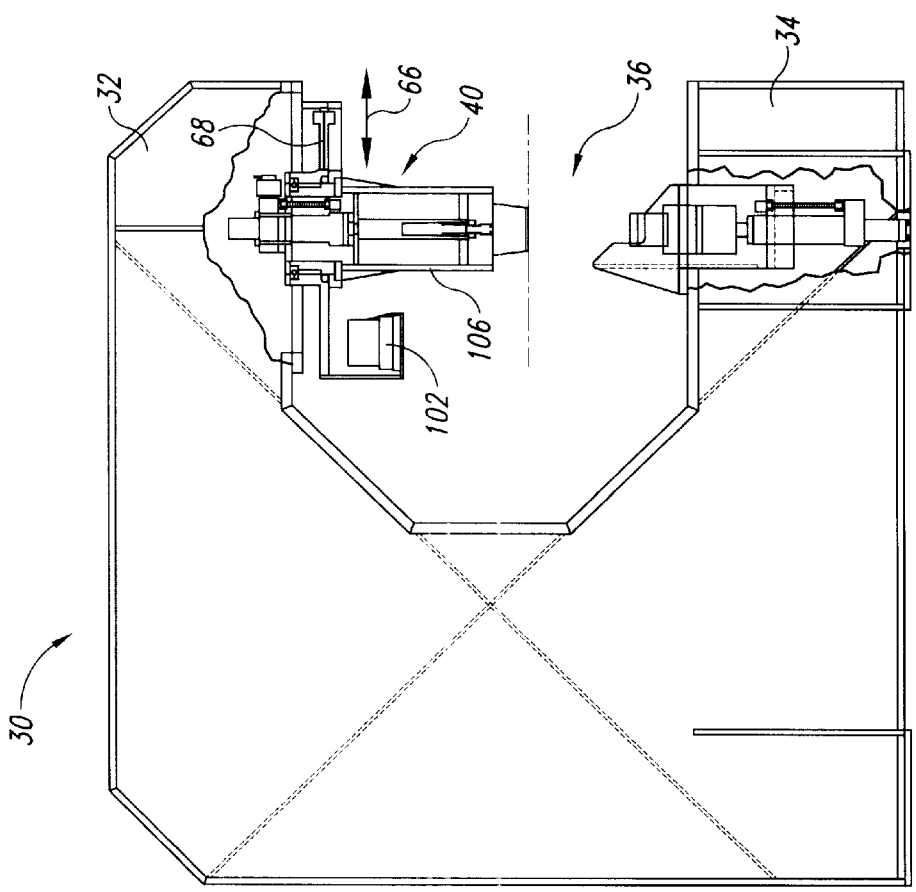
FIG. 3 is a side elevation of the structure shown in FIG. 2.

The fastener installation system consists of a lower tooling head 42 mounted on the lower arm 34 of the C-frame 30 and an upper turret tooling head 44 mounted on the upper arm 32 of the C-frame 30. A system is provided for accurately moving the tooling on the upper turret tooling head over the desired line of action and a controller 50 is provided for controlling that movement and otherwise for coordinating system action. As shown in FIGS. 3 and 4, the upper tooling head 44 is attached to the underside 52 of the upper arm 32 of the C-frame 30 such that it is directly above the lower or reactionary tooling head 42 over where it protrudes above the upper side 54 of the lower arm 34 of the C-frame 30, as shown in FIG. 3.

While this section often refers to the upper or primary tooling head 44 as the "upper" head and the reactionary tooling head 42 as the "lower" head, and while it describes the 'C' frame as moving relative to the workpiece, this is to assist in conceptualizing the preferred embodiment only. The same or equivalent structure could be oriented in reverse or other orientations and the operation would be the same.

Figure 5:
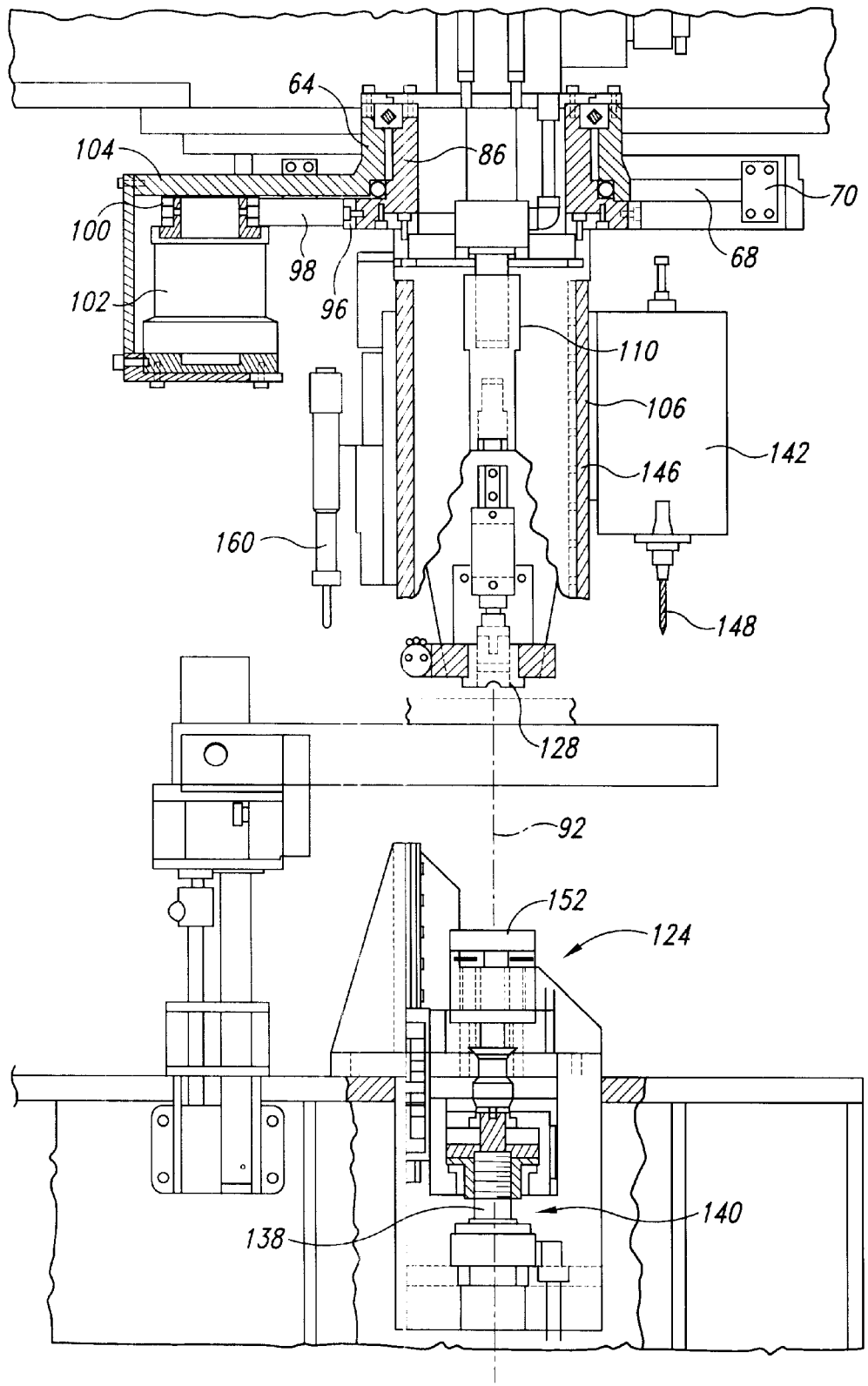
FIG. 5 is an enlarged side elevation, partly in section, of the turret head and lower reaction tooling shown in FIG. 2.
Figure 6:
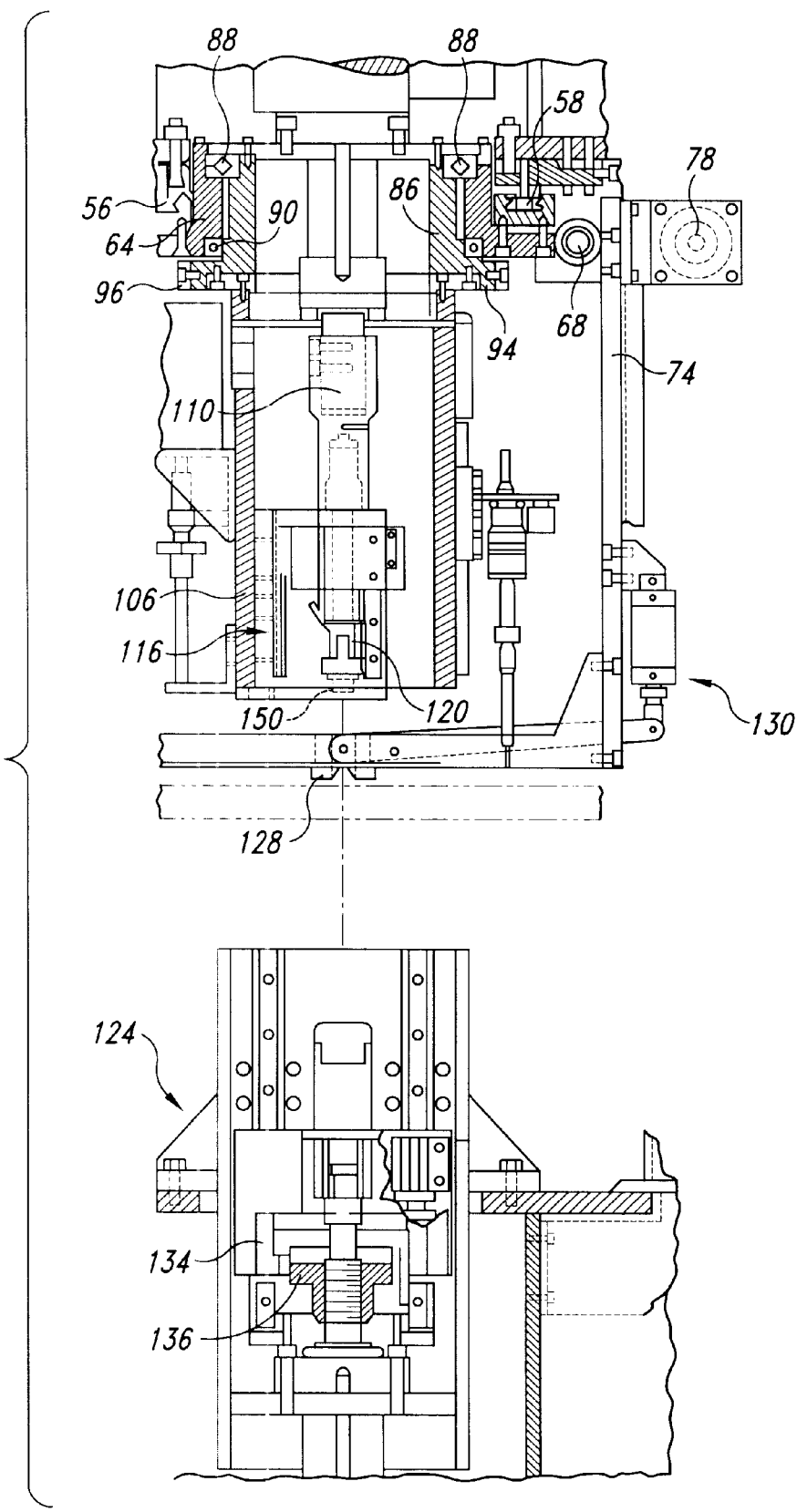
FIG. 6 is an enlarged front elevation, partly in section, of the structure shown in FIG. 5.
Figure 7:
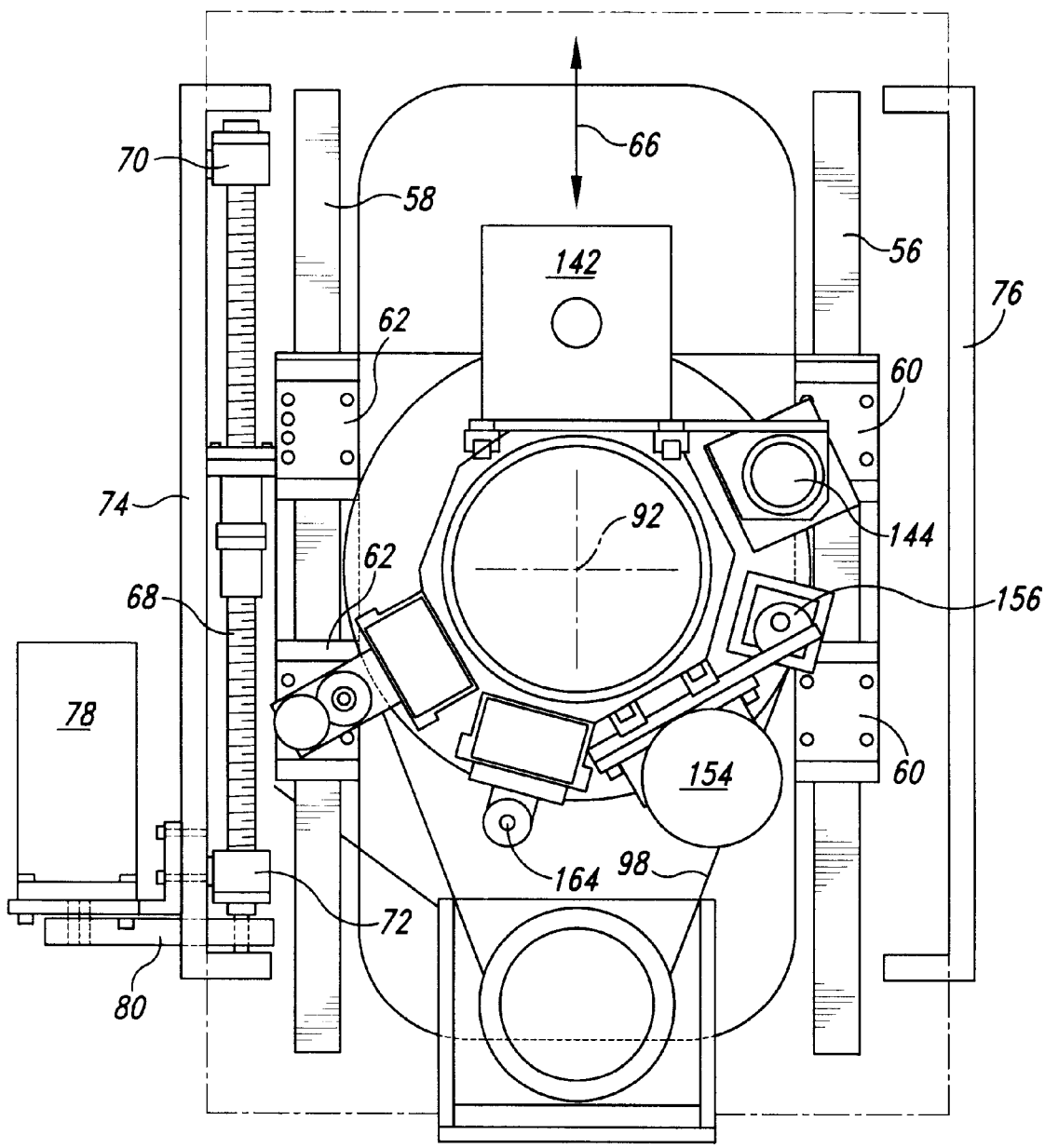
FIG. 7 is a plan view of the structure shown in FIG. 5.
Figure 8:
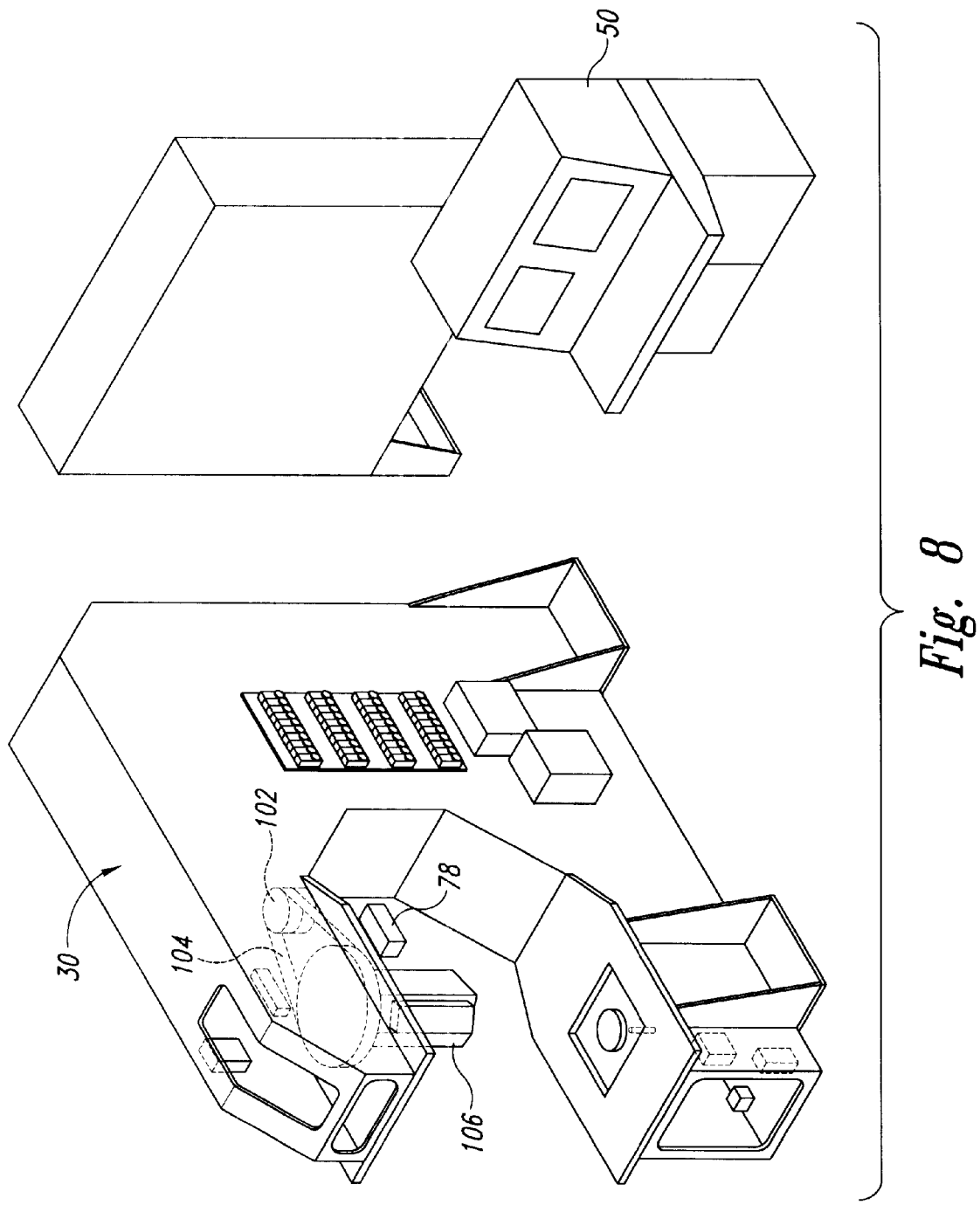
FIG. 8 is a schematic perspective view of the system shown in FIG. 2 along with the control system and power panel.

As shown in FIG. 4 and more clearly in FIGS. 6 and 7, two parallel linear rails 56 and 58 are rigidly mounted on the upper arm 32 of the C-frame 30 and are each engaged with a pair of linear bearings 60 and 62. Each pair of bearings 60 and 62 are in turn connected to opposite sides of a translating carriage 64 to support the carriage 64 for reciprocal linear translation inward and outward of the opening 36 of the C-frame 30 in the direction of the arrow 66 in FIGS. 3 and 7. A ball screw 68, shown in FIGS. 5 and 6, and most clearly shown in FIG. 7, is supported between front and rear bearings 70 and 72, respectively, attached to a depending support wing 74 connected along one edge of the underside 52 of the upper arm 32 opposite another depending support wing 76 at the opposite edge of the underside 52 of the upper arm 32. A servomotor 78 is mounted on the outside of the support wing 74 and is connected by a timing belt 80 to the ball screw 68. The timing belt is preferably a steel wire reinforced cog belt, such as a model 210L100 available from the Martin Company in Moline, Wis., and engages cog wheels on the servomotor 78 and the ball screw 68 for precise and repeatable positioning of a ball nut 82 on the ball screw 68. The ball nut 82 is attached to the carriage 64, whereby accurate control of the linear position of the carriage is achieved by the controller 50 energizing the servomotor 78 and monitoring its feedback position signals.

A capstan 86 is mounted in bearings 88 and 90 in a central opening in the carriage 64 for rotation about a central vertical axis 92. The lower end of the capstan has a radially projecting flange 94 to which a large diameter cog wheel 96 is connected. A timing belt 98 is engaged with the cog wheel 96 and another cog wheel 100 on a driven shaft of a computer numerically controlled servomotor 102 which controls turret rotation under control of the controller 50. The servomotor 102 is mounted on a horizontal extension 104 projecting from the carriage 64, as shown in FIG. 5. Computer numerical controls provided by the controller controlling the servomotors 78 and 102 for controlling the linear positioning of the carriage 64 and the rotational positioning of the capstan 86 offer better accuracy and are simpler to use in connection with a part program stored in a digital data base than air logic or other positioner control methods.

A turret 106, shown in in FIGS. 5 and 6, is connected to the lower surface of the flange 94 on the capstan 86 for rotation with the capstan. The turret 106 has eight tooling attachment faces 108 parallel to the axis of rotation 92 of the turret, although a greater or fewer number of faces 108 could be used. By coordinating the turret rotational servomotor 102 and carriage translation servomotor 78, the controller 50 can accurately position any tool mounted to the turret 106 over the same point. To do this, the controller 50 is 'taught' the position of the center of each tool relative to the axis 92 of the turret 106. The controller 50 may be taught this position by manually positioning the tool at a known point and programming the controller 50 to identify this point as a reference point.

A hydraulic actuator 110 is mounted inside the turret 106 just slightly offset from the axis 92. Flexible hydraulic lines (not shown) connect the hydraulic actuator 110 through a pressure control valve 112 to a high pressure hydraulic pump 114. The vertical motion of the hydraulic actuator 110 is guided by a linear bearing 116 attached to the turret to ensure precise vertical motion of the actuator 110 when inserting fasteners, and to eliminate side loads on the actuator which could cause wear or failure of the seals in the actuator. The pressure control valve 112 can be used to set the position or the force to be exerted by the hydraulic actuator 110. Pressure and position sensors in the turret feed back hydraulic pressure and actuator position data for accurate control by the controller A fastener feed tube 118 extends from a fastener feeder 120, such as the feeder shown in patent application Ser. No. 07/949,177 filed on Sep. 21, 1992 and entitled "Automated Spar Assembly Tool". The feed tube is connected to a fastener feeder 120 connected to the lower end of the hydraulic actuator 110 for insertion of fasteners, such as rivets, bolts and lockbolts, into holes drilled in the workpiece be a drill 122 located on the front facet of the turret 106. The fastener feeder can be any of several commercially available types, such as the one shown in U.S. Pat. No. 4,220,275.

To avoid deformation of the workpiece, the fastener feeder 120 should drive the fastener into the hole in the workpiece over the stationary reactionary tooling head 124. The fastener feeder 120 is typically a hydraulically driven ram acting in the direction of the rotational axis of the turret. Additionally, it is possible to use alternative fastener driving methods such as electromagnetic actuators. If more than one reactionary tool 124 is required, it may be manually changed. For example, the rivet die may be removed and replaced with a nut feeder and runner to driving nuts onto bolts, or a collar feeder and swager may be substituted for securing lockbolts. These tooling heads can also be mounted in a linear shuttle or lower turret and positioned automatically under control of the controller 50 by use of a three-position air cylinder system as disclosed in U.S. Pat. No. 5,231,747, for example.

An example of the typical panel fastening operation is an airplane wing panel having a skin panel with longitudinal stringers that must be riveted to it and chord wise ribs that may be bolted in place. The skin is either manually tack fastened to the stringers, or held in approximate relative position by tooling (not shown). The skin and stringers are then loaded into a support jig in a position to be spanned by the C-frame 30 and acted upon by the fastening machine carried by the C-frame. A pneumatically operated pressure foot 128 controlled by a pneumatic cylinder and piston 130 is mounted on a cross bar 132 at the lower end of the depending support wings 74 and 74'.

A reactionary pressure foot on the lower tooling clamps the skin and stringers during the entire fastening operation. The reactionary pressure foot is provided by an annular cylinder 134 mounted on a piston 136 threaded onto a vertically movable piston 138 of the lower hydraulic actuator 140 By driving the annular cylinder 134 of the lower pressure foot against a hard stop and affixing the upper pressure foot 128 to a linear variable differential transformer (LVDT), the skin and stringer stack thickness is determined.

The servomotor 102 is energized by the control system 50 to rotate the turret 106, and the other servomotor 78 translates the carriage 64 to position the axis of a drill motor 142 over the desired fastener location. The controller 50 actuates the drill motor 54, and a servomotor 144 on the turret 106 adjacent to the drill motor 142 lowers the drill motor on linear bearings 146 to drill a hole with a drill bit 148 through the workpiece, then withdraws it after the hole is drilled.

Upon drill retraction, the servomotors 78 and 102 translate and rotate the turret 106 to position the fingers 150 of a rivet holder over the hole so that it may be driven into the hole by the die on the upper hydraulic actuator 110. Then the hydraulic actuator exerts a downward squeezing force while the lower hydraulic actuator 140 exerts an upward squeezing force on the lower die 152 in contact with the tail of the rivet.with sufficient upset force to deform the rivet and securely fasten the stringer and skin together. Alternatively, the upper hydraulic actuator could be held stationary and the lower actuator 140 applies the entire force, thereby mimicing the action of conventional hydraulic rivet squeezers.

After the rivet is formed, the system controller 50 moves a micro-shaver 154 into place by simultaneously actuating servomotor driven carriage translation and turret rotation. The micro-shaver 154 is lowered on linear bearings by a servomotor 156 and shaves the rivet head flush with the adjacent wing skin. After shaving, the micro-shaver 154 is raised by the servomotor 156 to complete the fastener installation. The controller 50 releases the pressure feet 128 and 134, unclamping the skin and stringer, and the system is indexed to the next rivet location.

Bolt installation follows a substantially similar process, but several additional steps are necessary after the hole is drilled and before the fastener is installed. Instead of indexing from drill motor 142 to fastener inserter 150, a bolt hole must be coldworked, reamed, chamfered, and inspected before the bolt is inserted. This requires three additional tools on the turret 106.

After drilling, the controller 50 initiates turret rotation and carriage translation to position a coldworking mandrel 160 on one of the turret faces over the hole. The mandrel 160, part of a conventional hole cold working available from West Coast industries, is inserted through the hole and expands as it is drawn back through the hole, cold working the metal around the marginal regions of the hole in the workpiece. This process leaves a slight ridge in the hole that a reamer on the same spindle on the micro-shaver 154 can remove.

The reamer operates similarly to the drill motor. The controller 50 indexes the turret 106 to position the reamer motor 154 over the hole. The design of the reamer cutter incorporates a chamfer. Actuating the reamer motor 154 drives the reamer through the hole until the chamfer portion of the cutter chamfers the upper surface of the skin. Then the turret 106 is indexed, allowing an inspection probe 164 to feed through the hole verifying hole concentricity and diameter. If the controller 50 assessing the feed-back from the hole inspection probe 164 confirms that the hole is acceptable, then a bolt is fed into the hole by the fingers 150 on the upper hydraulic actuator. The lower tooling then positions and torques a nut or swages a collar onto the bolt and installation is complete.

It is noteworthy that the distance between any two sequential tools on the turret 106 can be less than the carriage travel on conventional linear feed tooling carriages, and that by simultaneously rotating and translating the turret, the time to index between tools can be much less than that necessary for exclusively linear translation.

Figure 9:
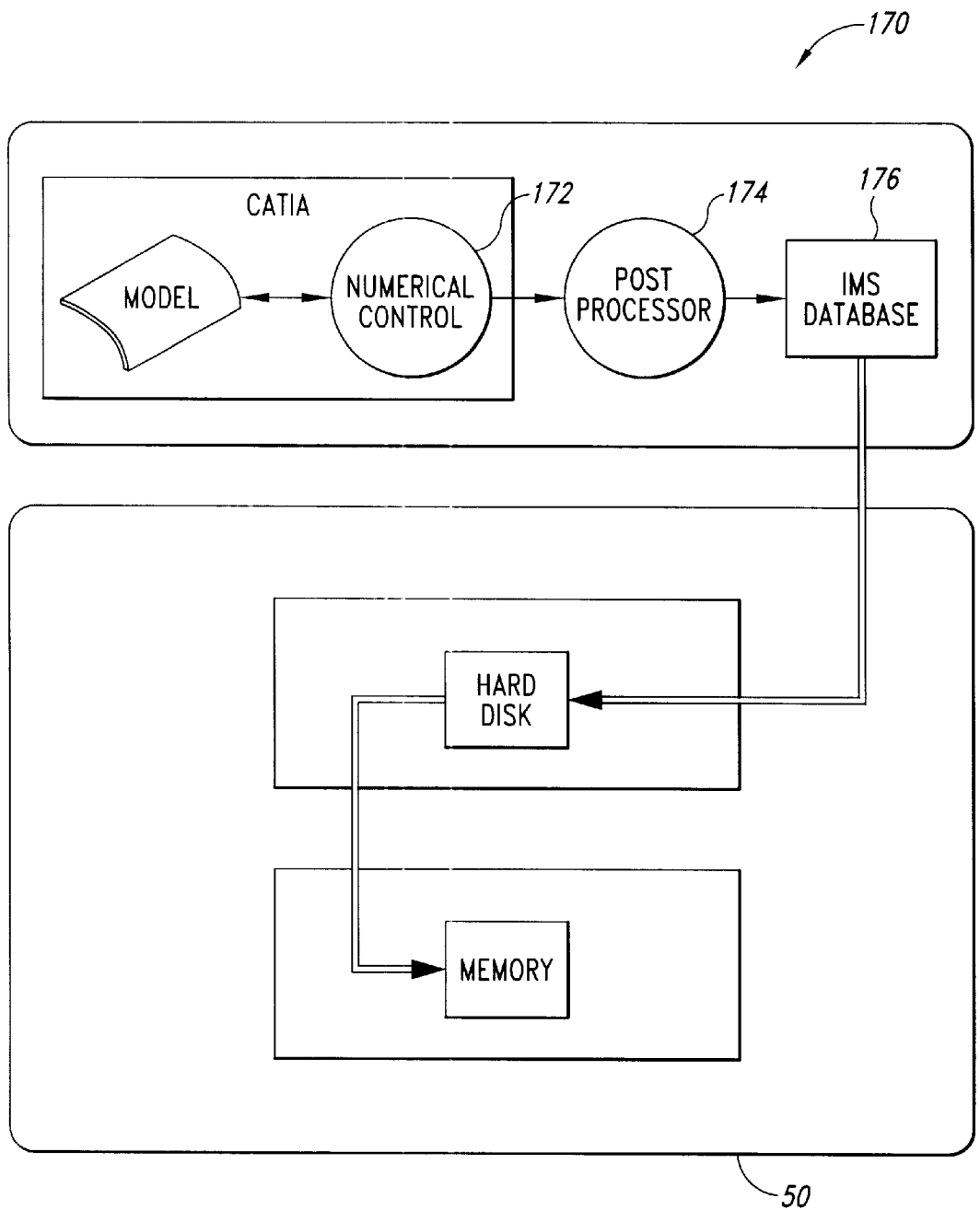
FIG. 9 is a schematic of the computer architecture for controlling the operation of the system shown in FIG. 2.

Turning now to FIG. 9, the computing architecture for control of the machine is shown schematically to include computer functions which are performed on a CAD/CAM main frame 170 where the original engineering digital product definition is recorded and available as the ultimate product definition authority. A numerical control 172 converts this data into a form that is usable by a post processor 174, which converts the digital parts definition data into a form that is compatible with the computer controller 50 for the machine and stores the parts information on an IMS Database 176. The IMS Database 176 is a large capacity storage bank for storing all the parts programs that will be used by the turret head fastener installaton machine.

The other computing functions are performed at the computer hardware station adjacent the fastener installation machine, and are performed by the machine controller 50 which in the case of the preferred embodiment is an Ormec Motion Controller. The machine controller 50 is connected to the IMS database 176 through a suitable computer connection such as a phone connection such as a DEC DEMSA and a DEC Microvax SNA Gateway, or preferably through an Ethernet TCP/IP.

One skilled in the art may conceive ways to vary, modify, or adapt the preferred embodiment disclosed herein. Therefore, it is to be understood that these variations, modifications, and adaptations, and the equivalents thereof, may be practiced while remaining within the spirit and scope of this invention as defined in the following claims, wherein we claim:

What is claimed is:

1. For use in connection with a fastener installation apparatus having a primary turret tooling head which has a plurality of tools mounted on said primary turret tooling head, each with a tooling center positioned around a centerline of said primary turret tooling head at varying radial distances from the centerline, each of said tools is actuated to operate on a fixed non-moving workpiece, and an opposed reactionary tooling head, a primary tooling head controller comprising:

a data acquisition computer;

primary turret tooling head computer numerically controlled servo motors operatively connecting said computer to said primary turret tooling head for rotational positioning of said turret, for linear translation of said turret, and for actuating said plurality of tools positioned around the centerline of said primary turret tooling head at varying radial distances from the centerline; and programming means operable to cause said computer to instruct said servo motors to perform said rotational positioning of said primary turret tooling head, to instruct said servo motors to perform said linear translation of said primary turret tooling head to compensate for the varying radial distances of said plurality of tools from the centerline of said primary turret tooling head, such that the tooling center for each of said plurality of tools on said primary turret coincides with a same point on the workpiece, and to instruct said servo motors to perform said actuating of one of said tools once the one of said tools is positioned to coincide with the same point on the workpiece.

2. An apparatus as defined in claim 1 wherein:

a programming means for remotely controlling both said linear translation of said turret, said rotational positioning of said turret, and said actuating of said tools.

3. For use in connection with a fastener installation apparatus having a primary turret tooling head which has a plurality of tools, each with a tooling center positioned around a centerline of said primary turret tooling head at varying radial distances from the centerline, each of said tools mounted on said primary turret tooling head and actuated to operate on a fixed non-moving workpiece, and an opposed reactionary tooling head, a primary tooling head controller comprising:

a data acquisition computer;

primary turret tooling head computer numerically controlled servo motors operatively connecting said computer to said primary turret tooling head for rotational positioning of said turret, for linear translation of said turret, and for actuating said plurality of tools positioned around the centerline of said primary turret tooling head at varying radial distances from the centerline; and programming means operable to cause said computer to instruct said servo motors to perform said rotational positioning of said primary turret tooling head, to instruct said servo motors to perform said linear translation of said primary turret tooling head to compensate for the varying radial distances of said plurality of tools from the centerline of said primary turret tooling head, such that the tooling center for each of said plurality of tools on said primary turret coincides with a same point on the workpiece, and to instruct said servo motors to perform said actuating of one of said tools once the one of said tools is positioned to coincide with the same point on the workpiece, wherein said programming means provides instructions to said computer on locating a centerline of said opposed reactionary tooling head.

4. For use in connection with a fastener installation apparatus having a primary turret tooling head which has a plurality of tools, each with a tooling center positioned around a centerline of said primary turret tooling head at varying radial distances from the centerline, each of said tools mounted on said primary turret tooling head and actuated to operate on a fixed non-moving workpiece, and an opposed reactionary tooling head, a primary tooling head controller comprising:

a data acquisition computer;

primary turret tooling head computer numerically controlled servo motors operatively connecting said computer to said primary turret tooling head for rotational positioning of said turret, for linear translation of said turret, and for actuating said plurality of tools positioned around the centerline of said primary turret tooling head at varying radial distances from the centerline; and programming means operable to cause said computer to instruct said servo motors to perform said rotational positioning of said primary turret tooling head, to instruct said servo motors to perform said linear translation of said primary turret tooling head to compensate for the varying radial distances of said plurality of tools from the centerline of said primary turret tooling head, such that the tooling center for each of said plurality of tools on said primary turret coincides with a same point on the workpiece, and to instruct said servo motors to perform said actuating of one of said tools once the one of said tools is positioned to coincide with the same point on the workpiece, wherein said computer instructs said servo motors to accurately position any of said tools on said primary turret tooling head over a centerline of said opposed reactionary tooling head based on an instruction by said programming means.

* * * * *